United States Patent
Brothers et al.

(10) Patent No.: US 6,835,243 B2
(45) Date of Patent: Dec. 28, 2004

(54) CEMENTING IN DEEP WATER OFFSHORE WELLS

(75) Inventors: Lance E. Brothers, Chickasha, OK (US); Anthony V. Palmer, Ardmore, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/854,857

(22) Filed: May 14, 2001

(65) Prior Publication Data

US 2001/0030044 A1 Oct. 18, 2001

Related U.S. Application Data

(63) Continuation of application No. 09/522,424, filed on Mar. 9, 2000, now Pat. No. 6,244,343.

(51) Int. Cl.$^7$ .............................................. C04B 24/00
(52) U.S. Cl. ...................... 106/692; 106/696; 106/724; 106/725; 106/727; 106/728; 106/819; 106/823
(58) Field of Search ................................ 106/692, 696, 106/724, 727, 728, 823, 819, 693

(56) References Cited

U.S. PATENT DOCUMENTS

| 5,454,866 | A | * | 10/1995 | Gilbert et al. | 106/695 |
| 5,488,991 | A | * | 2/1996 | Cowan et al. | 166/293 |
| 5,897,699 | A | | 4/1999 | Chatterji et al. | 106/678 |
| 6,238,474 | B1 | * | 5/2001 | Unsin | 106/692 |
| 6,273,191 | B1 | * | 8/2001 | Reddy et al. | 166/293 |

OTHER PUBLICATIONS

Publication entitled "Lea's Chemistry of Cement and Concrete," 4$^{th}$ Edition, 748–749 (1998).

* cited by examiner

*Primary Examiner*—Paul Marcantoni
(74) *Attorney, Agent, or Firm*—Craig W. Roddy; Conley-Rose, P.C.

(57) ABSTRACT

An improved method of cementing casing in a deep water offshore formation penetrated by a well bore comprising the steps of preparing a foamed cement composition comprised of calcium aluminate cement, a set accelerating additive, a thickening time increasing additive, water, a gas, and a mixture of foam forming and foam stabilizing surfactants; placing the cement composition in the annulus between the casing and well bore; and allowing the cement composition to set into a hard impermeable mass therein.

20 Claims, No Drawings

CEMENTING IN DEEP WATER OFFSHORE WELLS

CROSS-REFERENCES TO RELATED APPLICATION

This application is a Continuation of application Ser. No. 09/522,424 filed on Mar. 9, 2000, now U.S. Pat. No. 6,244,343.

BACKGROUND OF THE INVENTION

1. Field of the Invention

The present invention relates to improved methods and compositions for cementing casing strings in well bores, and more particularly, to methods and compositions for cementing conductor or surface casing strings in deep water offshore wells.

2. Description of the Prior Art

In carrying out completion operations in oil and gas wells, hydraulic cement compositions are commonly utilized. For example, hydraulic cement compositions are used in primary cementing operations whereby casing strings are cemented in well bores. That is, a hydraulic cement composition is pumped into the annular space between the walls of a well bore and the exterior of a casing string disposed therein. The cement composition is permitted to set in the annular space thereby forming an annular sheath of hardened impermeable cement therein. The objective of the cement sheath is to physically support and position the casing string in the well bore and bond the casing string to the walls of the well bore whereby the undesirable migration of fluids between zones or formations penetrated by the well bore is prevented.

Primary cementing operations in deep water offshore wells are particularly difficult in that they are carried out in well bores which penetrate formations between the sea floor or mud line and a depth generally under about 2,000 feet below the mud line. Such formations are often not well consolidated, readily fracture and often have highly pressured water flows therethrough. For example, the fracture gradients in subsea well bores in which conductor and/or surface casing strings are cemented limit the densities of the cement compositions utilized to 11 or 12 pounds per gallon. The high water flows through the well bores often wash away cement compositions which have densities below 10 to 11 pounds per gallon.

Another problem involved in deep water offshore well cementing is the temperature at which the cement composition must set. Deep water offshore wells typically have sea bottom temperatures ranging from about 32° F. to 55° F. depending on the geographical location. The cement compositions utilized for performing cementing operations at such temperatures must set and provide enough compressive strength to proceed with drilling without involving long waiting-on-cement (WOC) times, preferably less than 24 hours. Accordingly, the cement compositions must include set and strength accelerating agents to allow the cement compositions to set at the low temperatures involved and develop early compressive strengths. However, a problem in the use of set and strength accelerating agents is that they often cause the cement compositions to have thickening times which are too short to allow placement of the cement compositions in the formations or zones to be cemented. Thus, the cement compositions used in deep offshore wells must have relatively long thickening times to allow them to be pumped to the location to be cemented, but at the same time they must set and develop sufficient compressive strengths to allow further drilling as quickly as possible. The generally accepted requirements for cement compositions to overcome the above described problems in the Gulf Coast region of the United States include cement composition densities in the range of from 10 to 12 pounds per gallon, thickening times of from 3 to 5 hours and compressive strengths of from 400 to 600 psi at temperatures of from about 45° F. to about 55° F.

While methods and cement compositions have been developed and used heretofore for cementing in deep water offshore wells, there is a continuing need for improved methods and cement compositions whereby the cement compositions have pumping times which are sufficient to allow their placement in the zone to be cemented, but after placement they quickly set and develop high compressive strengths at low temperatures.

SUMMARY OF THE INVENTION

The present invention provides improved methods and compositions for cementing casing in deep water offshore formations penetrated by well bores which meet the needs described above and overcome the deficiencies of the prior art. The methods of the invention basically comprise the steps of preparing a foamed cement composition comprised of calcium aluminate cement, a set accelerating additive, a thickening time increasing additive, water in an amount sufficient to form a slurry, a gas in an amount sufficient to form a foam and a mixture of cement composition foam forming and foam stabilizing surfactants present in an amount sufficient to facilitate the formation of and stabilize the foam; placing the cement composition in the annulus between the casing and the well bore; and allowing the cement composition to set into a hard impermeable mass therein.

The calcium aluminate cement utilized in accordance with this invention is preferably a high alumina content calcium aluminate, the set accelerating additive is preferably a lithium salt, the thickening time increasing additive is preferably an acid such as citric acid and the mixture of cement composition foam forming and foam stabilizing surfactants is preferably a mixture of an ethoxylated alcohol ether sulfate, an alkyl or alkene amidopropylbetaine and an alkyl or alkene amidopropyl dimethylamine oxide.

It is, therefore, a general object of the present invention to provide improved methods of cementing casing strings in deep water offshore wells.

Other and further objects, features and advantages of the present invention will be readily apparent to those skilled in the art upon a reading of the description of preferred embodiments which follows.

DESCRIPTION OF PREFERRED EMBODIMENTS

The present invention provides improved methods and compositions for cementing casing in deep water offshore formations or zones penetrated by well bores. The methods basically comprise the steps of preparing a foamed cement composition having a predetermined pumping time and a quick set at low temperatures comprised of calcium aluminate cement, a set accelerating additive, a thickening time increasing additive, water in an amount sufficient to form a slurry, a gas in an amount sufficient to form a foam and a mixture of cement composition foam forming and foam stabilizing surfactants present in an amount sufficient to facilitate the formation of and stabilize the foam; placing the cement composition in the annulus between the casing and the well bore; and allowing the cement composition to set into a hard impermeable mass therein.

The foamed cement compositions utilized in accordance with this invention meet the generally accepted requirements for cementing casing in deep water offshore wells, namely, a cement composition density in the range of from 10 to 12 pounds per gallon, a thickening time of from 3 to 5 hours and rapid setting and development of compressive strengths of from 400 psi to 600 psi at temperatures of from 45° F. to 55° F.

The methods of the present invention are particularly suitable for cementing conductor and/or surface casing in deep water offshore formations or zones penetrated by well bores. The methods and cement compositions of the invention can be used in shallow high water flow formations in which conductor and/or surface strings are cemented as well as in the deeper, warmer formations in which other casing strings or liners are cemented. Generally, the cementing compositions of this invention can be utilized for cementing wells at depths from 0 to 8,000 feet or deeper.

It has been discovered that aqueous calcium aluminate cement compositions can be made to have predetermined long thickening times thereby allowing the cement compositions to be placed in a subterranean zone to be cemented and very short transition times (sometimes referred to as "right angle sets") whereby after being placed the cement compositions very quickly set and develop compressive strength.

Calcium aluminate cement has the general formula $(CaO)_n(Al_2O_3)_m$ where the values of m and n are such that the amount of CaO in the calcium aluminate cement can vary from about 20% to about 40% by weight and the amount of the $Al_2O_3$ can vary from about 60% to about 80% by weight. The calcium aluminate cement which is preferred for use in accordance with this invention is a high alumina content calcium aluminum cement, i.e., such a cement having about 80% by weight alumina therein. This preferred calcium aluminate cement is commercially available from the Lafarge Corporation of Reston, Va., under the trade designation "SECAR™-71."

The set accelerating additive which functions in the cement composition to cause it to have a short transition time, i.e., the time between when the cement composition develops gel strength and when it sets into a hard impermeable mass, is a lithium salt. Examples of such lithium salts include, but are not limited to, lithium chloride, lithium carbonate, lithium sulfate and lithium hydroxide. Of these, lithium chloride is preferred for use in accordance with this invention. The set accelerating additive is included in the cement composition of this invention in an amount in the range of from about 0.1% to about 1.0% by weight of cement in the composition, more preferably, in an amount from about 0.2% to about 0.5%.

The thickening time increasing additive useful in accordance with this invention is an acid selected from the group consisting of citric acid, gluconic acid and tartaric acid. Of these, citric acid is preferred. The thickening time increasing additive is included in a cement composition of this invention in an amount in the range of from about 0.5% to about 2.0% by weight of cement in the composition, more preferably, in an amount from about 0.5% to about 1.5%.

The water in the cement composition can be fresh water or salt water. The term "salt water" is used herein to mean unsaturated salt solutions and saturated salt solutions including brines and seawater. The water is generally present in the cement composition in an amount sufficient to form a pumpable slurry, and more specifically, in an amount in the range of from about 40% to about 50% by weight of calcium aluminate cement in the composition.

The gas utilized for foaming the cement compositions of this invention can be air or nitrogen, with nitrogen being preferred. The gas is generally present in an amount sufficient to foam the cement composition to a density in the range of from about 10 to about 12 pounds per gallon.

The mixture of foaming and foam stabilizing surfactants can be a mixture of an ethoxylated alcohol ether sulfate surfactant of the formula:

$$H(CH_2)_a(OC_2H_4)_bOSO_3M^+$$

wherein a is an integer in the range of from about 6 to about 10, b is an integer in the range of from about 3 to about 10 and M is an alkali metal or ammonium and an alkyl or alkene amidopropylbetaine surfactant having the formula:

$$R-CONHCH_2CH_2CH_2N^+(CH_3)_2CH_2CO_2^-$$

wherein R is a radical selected from the group of decyl, cocoyl, lauryl, cetyl and oleyl.

A more preferred mixture of foaming and foam stabilizing surfactants which is particularly suitable for use in accordance with this invention is comprised of a mixture of an ethoxylated alcohol ether sulfate surfactant having the above described formula, an alkyl or alkene amidopropylbetaine surfactant having the above formula and an alkyl or alkene amidopropyldimethylamine oxide surfactant having the formula:

$$R-CONHCH_2CH_2CH_2N^+(CH_3)_2O^-$$

wherein R is a radical selected from the group of decyl, cocoyl, lauryl, cetyl and oleyl.

The two component mixture of surfactants described above is generally comprised of about 2 parts by weight of the ethoxylated alcohol ether sulfate surfactant and one part by weight of the alkyl or alkene amidopropylbetaine surfactant. The more preferred three component surfactant mixture generally contains the ethoxylated alcohol ether sulfate in an amount in the range of from about 60 to about 64 parts by weight, the alkyl or alkene amidopropylbetaine surfactant in an amount in the range of from about 30 to about 33 parts by weight and the alkyl or alkene amidopropyldimethylamine oxide surfactant in an amount of about 3 to about 10 parts by weight.

The mixture of cement composition foaming and foam stabilizing surfactants is generally present in the cement composition of this invention in an amount in the range of from about 1.0% to about 4.0% by weight of water in the composition, more preferably, in an amount of about 2.0% to about 3.0%.

As will be understood by those skilled in the art, in specific applications and at specific depths in deep water offshore wells, other additives which are well known to those skilled in the art and which do not adversely affect the required properties of the cement composition can be included therein. Examples of such additives include, but are not limited to, fluid loss control additives, viscosifying agents, thixotropic agents and anti-settling agents.

A method of the present invention which is particularly suitable for cementing casing in a deep water offshore formation or zone penetrated by a well bore is comprised of the steps of: (a) preparing a foamed cement composition comprised of high alumina content calcium aluminate cement, a set accelerating additive comprised of lithium chloride present in an amount in the range of from about 0.2% to about 0.5% by weight of cement in the composition, a thickening time increasing additive comprised of citric acid present in the composition in an amount in the range of from about 0.5% to about 1.5% by weight of cement in the composition, water in an amount in the range of from about 40% to about 50% by weight of cement in the composition, nitrogen present in an amount sufficient to form a foam having a density in the range of from about 10 to about 12 pounds per gallon and a mixture of cement composition foam forming and foam stabilizing surfactants comprised of an alcohol ether sulfate ethoxylated with from about 3 to about 10 moles of ethylene oxide, an alkyl or alkene amidopropylbetaine and an alkyl or alkene amidopropyldimethylamine oxide, the mixture being present in the composition in an amount in the range of from about 2.0% to about 3.0% by weight of water in the composition; (b) pumping the cement composition into the annulus between the casing and the well bore; and (c) allowing the cement composition to set into a hard impermeable mass therein.

In order to further illustrate the methods and cement compositions of this invention, the following examples are given.

EXAMPLE 1

Test calcium aluminate cement slurries containing calcium aluminate cements having various alumina contents, a lithium chloride set accelerating additive in various amounts, a citric acid thickening time increasing additive in various amounts and fresh water in various amounts were prepared. Each of the test cement slurries were placed in 80° F. atmospheric consistometers and cooled to 45° F. over a time period of 30 minutes. The cement slurries were then stirred for 30 minutes at 45° F. and transferred to a 45° F. autoclave for the cure times specified in Table I below. The results of these tests are set forth in Table I.

TABLE I

Cement Slurry Compressive Strengths at 45° F.

Cement Composition Components

| Test No. | Calcium Aluminate, % by wt. | Lithium Chloride, % by wt. | Citric Acid, % by wt. | Water, % by wt. | Compressive Strength |
|---|---|---|---|---|---|
| 1 | 58.9[1] | 0.1 | 1 | 40 | Not Set In 4 Hours |
| 2 | 48.9[2] | 0.1 | 1 | 50 | Not Set In 4 Hours |
| 3 | 48.8[2] | 0.2 | 1 | 50 | Not Set In 4 Hours |
| 4 | 48.7[2] | 0.3 | 1 | 50 | Not Set In 6 Hours |
| 5 | 59.1[1] | 0.2 | 0.7 | 40 | 330 psi In 4 Hours |
| 6 | 59.1[1] | 0.2 | 0.7 | 40 | 1570 psi In 6 Hours |

[1]High alumina content ("SECAR ™-71" from Lafarge Corp.)
[2]Lower alumina content ("SECAR ™-60" from Lafarge Corp.)

From Table I it can be seen that the calcium aluminate cement containing a high alumina content (Lafarge "SECAR™-71"), 0.2% lithium chloride, 0.7% citric acid and 40% water set and developed compressive strength in less than 4 hours.

EXAMPLE 2

A calcium aluminate cement composition was prepared comprised of high alumina content calcium aluminate cement ("SECAR™-71"), 0.2% of lithium chloride set accelerating additive, 1% citric acid thickening time increasing additive and 40% fresh water (all by weight of cement).

Test portions of the cement composition were placed in a 100° F. atmospheric consistometer. While stirring the test portions of the composition, the temperature was reduced to 45° F. over a 30 minute period. The test portions were then stirred an additional 2 hours and 30 minutes at 45° F. after which 2% by weight of the water component of the mixture and the mixture of foam forming and foam stabilizing surfactants described above were added to the test portions. Each of the test portions was foamed with air and placed in a 45° F. water bath for the cure time periods set forth in Table II below. The compressive strengths of the set test portions were determined. The results of the tests are given in Table II below.

TABLE II

Foamed Cement Slurry Compressive Strengths at 45° F.

| Foamed Cement Slurry Density, lb/gal | Retarder Used | Cure Time, hours | Compressive Strengh, psi |
|---|---|---|---|
| 11.9 | Tartaric Acid | 20 | 1410 |
| 12.7 | Citric Acid | 5 | 700 |
| 11.4 | Citric Acid | 4 | 580 |

From Table II it can be seen that the calcium aluminate compositions of this invention meet the requirements for cementing deep water offshore wells, i.e., densities in the range of from 10 to 12 pounds per gallon, thickening times of from 3 to 5 hours and rapid compressive strength development to 400–600 psi at temperatures from 45° F. to 55° F.

Thus, the present invention is well adapted to attain the objects and advantages mentioned as well as those which are inherent therein. While numerous changes may be made by those skilled in the art, such changes are encompassed within the spirit of this invention as defined by the appended claims.

What is claimed is:

1. A foamed cement composition having a set pumping time and a quick set at temperatures as low as about 32° F. comprising:
   a calcium aluminate cement;
   a set accelerating additive;
   a retarder;
   water in an amount sufficient to form a foam; and
   a mixture of cement composition foam forming and foam stabilizing surfactants present in an amount sufficient to facilitate the formation of and stabilize said foam.

2. The cement composition of claim 1 wherein said calcium aluminate cement has an alumina content of about 80% by weight of said cement.

3. The cement composition of claim 1 wherein said set accelerating additive is a lithium salt selected from the group consisting of lithium chloride, lithium carbonate, lithium sulfate and lithium hydroxide.

4. The cement composition of claim 1 wherein said lithium salt is lithium chloride.

5. The cement composition of claim 1 wherein said set accelerating additive is present in said composition in an amount in the range of from about 0.1% to about 1% by weight of cement therein.

6. The cement composition of claim 1 wherein said retarder is selected from the group consisting of citric acid, gluconic acid and tartaric acid.

7. The cement composition of claim 1 wherein said retarder is citric acid.

8. The cement composition of claim 1 wherein said retarder is present in said composition in an amount in the range of from about 0.5% to about 2% by weight of cement therein.

9. The cement composition of claim 1 wherein said water is selected from the group consisting of fresh water and salt water.

10. The cement composition of claim 1 wherein said water is present in said composition in an amount in the range of from about 40% to about 50% by weight of cement therein.

11. The cement composition of claim 1 wherein said gas is selected from the group consisting of air and nitrogen.

12. The cement composition of claim 1 wherein said gas is nitrogen.

13. The cement composition of claim 1 wherein said gas is present in said composition in an amount sufficient to foam said composition to a density in the range of from about 10 to about 12 pounds per gallon.

14. The cement composition of claim 1 wherein said mixture of foam forming and foam stabilizing surfactants in said composition comprises an alcohol ether sulfate ethoxylated with from about 3 to about 10 moles of ethylene oxide, an alkyl or alkene amidopropylbetaine and an alkyl or alkene amidopropyl dimethylamine oxide.

15. The cement composition of claim 1 wherein said mixture of foaming and foam stabilizing surfactants is present in said cement composition in an amount in the range of from about 1% to about 4% by weight of water in said composition.

16. A foamed cement composition having a set pumping time and a quick set at temperatures as low as about 32° F. comprising:

a calcium aluminate cement having an alumina content of about 80% by weight of said cement;

a set accelerating additive selected from the group consisting of lithium chloride, lithium carbonate, lithium sulfate and lithium hydroxide present in said composition in an amount in the range of from about 0.2% to about 0.5% by weight of cement therein;

a retarder selected from the group consisting of citric acid, gluconic acid and tartaric acid present in said composition in an amount in the range of from about 0.5% to about 1.5% by weight of cement therein;

water selected from the group consisting of fresh water and salt water present in said composition in an amount in the range of from about 40% to about 50% by weight of cement therein;

nitrogen gas present in said composition in an amount sufficient to foam said cement composition to a density in the range of from about 10 about 12 pounds per gallon; and a mixture of foam forming and foam stabilizing surfactants comprised of an alcohol ether sulfate ethoxylated with from about 3 to about 10 moles of ethylene oxide, an alkyl or alkene amidopropylbetaine and an alkyl or alkene amidopropyl dimethylamine oxide, said mixture being present in said composition in an amount in the range of from about 2% to about 3% by weight of water in said composition.

17. The cement composition of claim 16 wherein said set accelerating additive is lithium chloride.

18. The cement composition of claim 16 wherein said retarder is citric acid.

19. The cement composition of claim 16 wherein said water is salt water.

20. The cement composition of claim 16 wherein said mixture of foam forming and foam stabilizing surfactants comprises said ethoxylated alcohol ether sulfate in an amount in the range of from about 60 to about 64 parts by weight, said alkyl or alkene amidopropylbetaine in an amount in the range of from about 30 about 33 parts by weight and said alkyl or alkene amiopropyldimethylamine oxide in an amount in the range of from about 3 to about 10 parts by weight.

* * * * *